No. 877,445. PATENTED JAN. 21, 1908.
W. B. McPHERSON.
OXIDIZING MEANS FOR SOLUTIONS.
APPLICATION FILED FEB. 7, 1907.

Witnesses:
Inventor:
William B. McPherson.

UNITED STATES PATENT OFFICE.

WILLIAM B. McPHERSON, OF LOS ANGELES, CALIFORNIA, ASSIGNOR TO NON ACID COPPER EXTRACTING COMPANY, OF LOS ANGELES, CALIFORNIA, A CORPORATION OF CALIFORNIA.

OXIDIZING MEANS FOR SOLUTIONS.

No. 877,445.  Specification of Letters Patent.  Patented Jan. 21, 1908.

Application filed February 7, 1907. Serial No. 356,291.

*To all whom it may concern:*

Be it known that I, WILLIAM B. MCPHERSON, a citizen of the United States, residing at Los Angeles, in the county of Los Angeles and State of California, have invented a new and useful Oxidizing Means for Solutions, of which the following is a specification.

This invention relates to means for oxidizing solution, and is particularly intended for use in oxidation of iron solutions used in copper leaching and separating processes.

The main object of the invention is to produce the oxidation in a convenient, economical and rapid manner.
Another object of the invention is to obviate the use of high pressure air supply, such as is required when the oxidizing air is blown through the solution.

Figure 1:
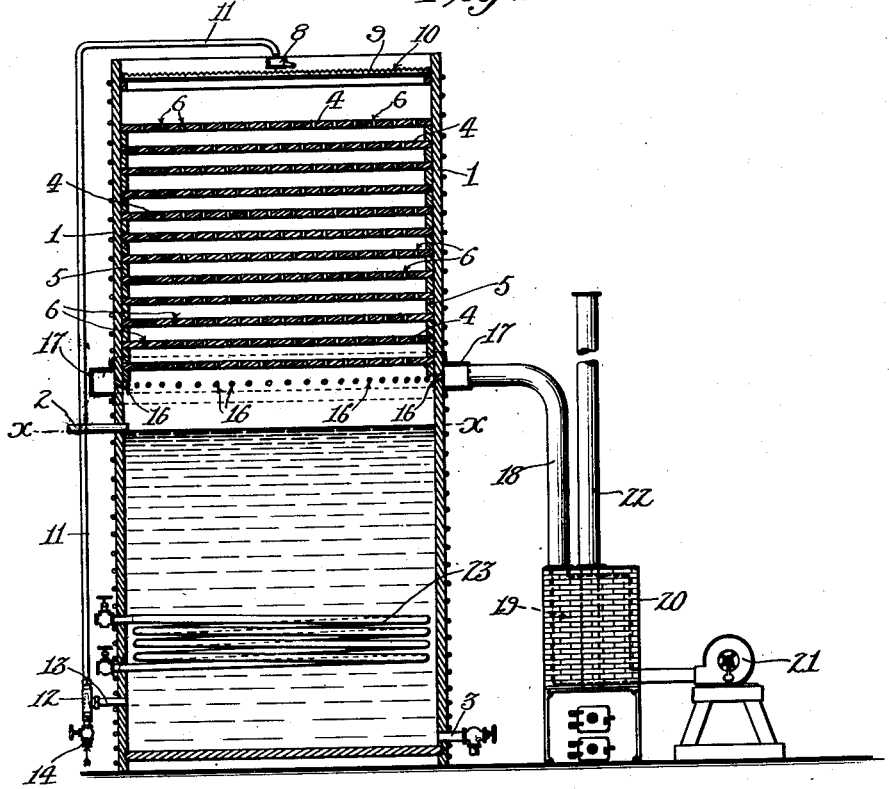
Figure 2:
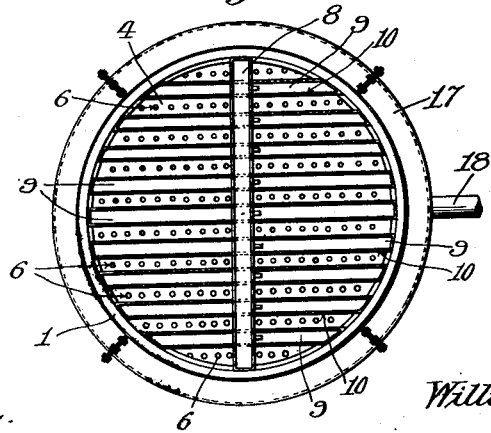

In the accompanying drawings: Figure 1 is a vertical section of the apparatus. Fig. 2 is a plan thereof.

1 designates a tank which may be of circular or any other suitable form and may be of any suitable material adapted to resist the action of solution therein contained. The solution in the tank is assumed to rise to about the level indicated by the line $x$—$x$. At 2 and 3 are designated inlet and outlet means or pipes for supplying the solution and drawing it from the tank as desired. It will be understood, however, that any suitable means may be used for this purpose. Above the solution line $x$—$x$ are provided a plurality of intercepters or perforate partitions formed, for example, of boards 4 placed across the tank between the supporting means 5 on the sides of the tank, said boards having perforations 6 distributed throughout the same, these perforations being staggered, offset or alternately arranged in successive partitions, so that the fluid passing down through the perforations in any one board will fall on the unperforated portion on the board below and will have to flow along the same before it can again descend through the perforations therein. At the top of the tank are provided means for supplying the solution or fluid thereto in a distributed manner, said means consisting, for example, of a trough 8 extending crosswise of the top of the tank and discharging into lateral troughs 9 extending transversely thereto, the edges of said extensions being notched as at 10 to permit the fluid to flow over the said edges in distributed streams on to the uppermost intercepter 4. Means are provided for circulating the fluid from the lower part of the tank to this distributer, said means consisting, for example, of a pipe 11 connected to a jet pump or ejector 12 having a lateral inlet 13 opening from the bottom portion of the tank and having a steam inlet 14 whereby steam supplied to said inlet will draw the fluid into the pipe 11 and force it to the top of the tank, the fluid passing from the said pipe into the distributer trough 8. Below the lowermost of the intercepters or partition means 4 is provided means for supplying air through the tank, for which purpose the side wall of the tank has a number of holes 16 extending upwardly and outwardly to communicate with a trunk or airbox 17 surrounding the tank. Into this trunk opens the air supply pipe 18 leading from an air chamber 19 of a hot air furnace 20, the said air chamber being supplied from the outer air by a fan or blower 21.

22 designates the stack of the furnace. Means may also be provided for heating the solution in the tank, for example, a pipe or coil 23 connected to a supply of either live or exhaust steam.

The operation is as follows:—Fluid or solution having been supplied to the tank by the means 2 is continually circulated by the pump 12 which forces the fluid from the lower part of the tank up to the distributer, whence it flows in streams on to the uppermost intercepter or partition, running through the holes in said intercepter down on to the second intercepter or partition and so on. Said holes are of sufficient size to enable the fluid to run down the edges of the holes without clogging the holes. At the same time the air supply means is operated, forcing a current of air through the heater or hot air furnace into the air trunk 17, the air passing thence through the holes 16 into the tank space above the solution and below the lowermost intercepter or partition, whence the air flows upwardly through the perforations 6 in the successive intercepters or partitions and passes out at the top. In thus passing in contact with the solution distributed over a large surface, oxidation is secured with much greater rapidity than can be obtained by blowing through the solution, on account of the much greater surface exposed. The heating of the air supply conduces to the action, and furnishes the requisite heat in the most convenient manner.

What I claim is:—

1. An apparatus for oxidizing solutions, comprising a tank, a plurality of intercepter partitions extending across the tank, said partitions having perforations which are offset in successive partitions, means for supplying solution above the uppermost partition and passing air into the tank below the partitions, and means for withdrawing the solution to maintain the level of the solution at a point below the lowermost partition and below the air supply whereby the air is caused to pass upwardly through the partitions, in contact with the solution thereon.

2. An apparatus for oxidizing solutions, comprising a tank, a plurality of perforated partitions extending across the tank, a distributer at the top of the tank, over the uppermost partition, means for furnishing liquid from the bottom part of the tank to said distributer, and means for forcing air into the tank below the said partitions, whereby the air is caused to pass upwardly through the partitions, in contact with the solution therein.

3. An apparatus for oxidizing solutions, comprising a tank, a plurality of perforated partitions extending across the tank, a distributer at the top of the tank, over the uppermost partition, means for furnishing liquid from the bottom part of the tank to said distributer, and means for forcing heated air into the tank below the said partitions, whereby the air is caused to pass upwardly through the partitions, in contact with the solution therein.

4. An apparatus for oxidizing solutions, comprising a tank, a plurality of perforated partitions extending across the tank, a distributer at the top of the tank, over the uppermost partition, means for furnishing liquid from the bottom part of the tank to said distributer, means for forcing heated air into the tank below the said partitions, whereby the air is caused to pass upwardly through the partitions, in contact with the solution therein, and means for heating the solution in the tank.

In testimony whereof, I have hereunto set my hand at Los Angeles California this 25th day of January 1907.

WILLIAM B. McPHERSON.

In presence of—
ARTHUR P. KNIGHT,
FRANK L. A. GRAHAM.